US008185751B2

(12) United States Patent
Osmond et al.

(10) Patent No.: US 8,185,751 B2
(45) Date of Patent: May 22, 2012

(54) ACHIEVING STRONG CRYPTOGRAPHIC CORRELATION BETWEEN HIGHER LEVEL SEMANTIC UNITS AND LOWER LEVEL COMPONENTS IN A SECURE DATA STORAGE SYSTEM (75) Inventors: Roger F. Osmond, Littleton, MA (US); Gil Goren, Ashland, MA (US)

(73) Assignee: EMC Corporation, Hopkinton, MA (US)

( * ) Notice: Subject to any disclaimer, the term of this patent is extended or adjusted under 35 U.S.C. 154(b) by 1018 days.

(21) Appl. No.: 11/426,641

(22) Filed: Jun. 27, 2006

(65) Prior Publication Data
US 2007/0300081 A1    Dec. 27, 2007

(51) Int. Cl.
G06F 11/30    (2006.01)

(52) U.S. Cl. ........ 713/193; 713/165; 713/166; 713/161; 726/30; 380/37; 709/211; 709/226; 707/2; 707/704

(58) Field of Classification Search .......... 713/189–194, 713/161–168; 726/27–33; 380/277–286
See application file for complete search history.

(56) References Cited

U.S. PATENT DOCUMENTS

| 5,113,442 | A  | * | 5/1992  | Moir ............................ 713/167 |
| 5,202,971 | A  | * | 4/1993  | Henson et al. .................... 1/1 |
| 5,940,507 | A  | * | 8/1999  | Cane et al. ................... 713/165 |
| 6,996,712 | B1 | * | 2/2006  | Perlman et al. ............... 713/161 |
| 7,136,903 | B1 | * | 11/2006 | Phillips et al. ................ 709/217 |
| 7,222,231 | B2 | * | 5/2007  | Russell et al. ................ 713/165 |
| 7,313,694 | B2 | * | 12/2007 | Riedel et al. ................. 713/165 |
| 7,337,320 | B2 | * | 2/2008  | Tada et al. ................... 713/171 |
| 7,460,672 | B2 | * | 12/2008 | Klein ............................. 380/278 |
| 7,484,245 | B1 | * | 1/2009  | Friedman et al. ............... 726/27 |
| 7,487,353 | B2 | * | 2/2009  | Pryor et al. ................... 713/170 |
| 7,568,097 | B2 | * | 7/2009  | Burnett ......................... 713/165 |
| 7,603,553 | B1 | * | 10/2009 | Corbett et al. ................ 713/165 |
| 7,734,603 | B1 | * | 6/2010  | McManis ....................... 707/696 |
| 7,814,552 | B2 | * | 10/2010 | Chen .............................. 726/26 |
| 7,873,700 | B2 | * | 1/2011  | Pawlowski et al. ............ 709/213 |
| 8,094,810 | B2 | * | 1/2012  | Hohenberger et al. ......... 380/28 |
| 2002/0091975 | A1 |   | 7/2002 | Redlich et al. |
| 2002/0133707 | A1 | * | 9/2002 | Newcombe ................... 713/183 |
| 2002/0150250 | A1 | * | 10/2002 | Kitaya et al. ................. 380/277 |
| 2002/0166026 | A1 | * | 11/2002 | Ulrich et al. ................. 711/114 |
| 2002/0166053 | A1 |   | 11/2002 | Wilson |
| 2003/0056095 | A1 |   | 3/2003 | Elliott et al. |

(Continued)

OTHER PUBLICATIONS

Michail D. Flouris, Using Lightweight Transactions and Snapshots for Fault-tolerant Services Based on Shared Storage Bricks, Sep. 25, 2006, IEEE, pp. 5-10.*

*Primary Examiner* — Nathan Flynn
*Assistant Examiner* — Viral Lakhia
(74) *Attorney, Agent, or Firm* — Krishnendu Gupta; Joseph D'Angelo (57) ABSTRACT

A data storage architecture for networked access by clients includes a file server capable of communication with the clients via the network, physical storage organized as a plurality of logical volumes, and an encryption device in communication with both the file server and the physical storage. The encryption device is operable in response to signaling from the file server, including an indication of a range of blocks of data, to cause encryption of the range of blocks with an encryption key that is unique within the physical storage. The encryption device includes nested tables mapping block ranges to encryption keys. Consequently, undesirable key sharing across files, file systems, and other units can be avoided down to the block level.

34 Claims, 5 Drawing Sheets

U.S. PATENT DOCUMENTS

| | | | |
|---|---|---|---|
| 2003/0070071 A1* | 4/2003 | Riedel et al. | 713/165 |
| 2003/0081790 A1* | 5/2003 | Kallahalla et al. | 380/281 |
| 2003/0101322 A1* | 5/2003 | Gardner | 711/163 |
| 2003/0120923 A1* | 6/2003 | Gilman et al. | 713/170 |
| 2003/0126434 A1 | 7/2003 | Lim et al. | |
| 2003/0212886 A1* | 11/2003 | Sugiura | 713/150 |
| 2004/0010699 A1 | 1/2004 | Shao et al. | |
| 2004/0054893 A1 | 3/2004 | Ellis | |
| 2004/0153642 A1 | 8/2004 | Plotkin et al. | |
| 2004/0250101 A1* | 12/2004 | Kanai | 713/193 |
| 2004/0252831 A1* | 12/2004 | Uehara | 380/44 |
| 2005/0078822 A1 | 4/2005 | Shavit et al. | |
| 2005/0262573 A1* | 11/2005 | Bo et al. | 726/27 |
| 2005/0268114 A1* | 12/2005 | Thibadeau | 713/189 |
| 2006/0015945 A1* | 1/2006 | Fields | 726/27 |
| 2006/0136735 A1* | 6/2006 | Plotkin et al. | 713/182 |
| 2006/0147040 A1* | 7/2006 | Lee et al. | 380/28 |
| 2006/0200502 A1* | 9/2006 | Tanaka et al. | 707/203 |
| 2007/0050851 A1* | 3/2007 | Musha et al. | 726/27 |
| 2007/0106668 A1* | 5/2007 | Maegawa et al. | 707/9 |

* cited by examiner

OP Codes 400

| 00 | NOOP (useful for keep-alive and debugging support) |
| 01 | Put ranges (denotes complete set of ranges for that ID) |
| 02 | Append/update ranges |
| 03 | Delete ranges |
| 04 | Get ranges (range count would be zero in this case) |
| 05 | Get CID (CID field would be blank, but ranges are required) |
| 06 | Get Server ID (if CID blank, look up ranges, else look up CID) |

ACHIEVING STRONG CRYPTOGRAPHIC CORRELATION BETWEEN HIGHER LEVEL SEMANTIC UNITS AND LOWER LEVEL COMPONENTS IN A SECURE DATA STORAGE SYSTEM

FIELD OF THE INVENTION

This invention relates generally to the field of data storage, and more particularly to encrypted data storage.

BACKGROUND OF THE INVENTION

Protection of confidential information may be more difficult than ever before because of the proliferation of networked computing devices. Comprehensive protection of information stored in computer-readable form should include identity management, authorization/authentication, data integrity assurance, proper logging/auditing, i.e., to ensure chain of custody, and a guarantee of confidentiality. Data encryption is part of most protection regimes. Data encryption is known for protecting both data in-flight and data at rest. Data in-flight encryption is especially valuable for data that leaves the relatively safer and more secure "behind the firewall" environment. Data in-flight has received significant attention, and there are many commercially available products. Data at rest has received less attention. Recently, there have been some highly publicized incidents in which data at-rest in the form of backups on tapes have been lost or otherwise compromised. This publicity has lead to increased demand for encryption of data at rest on tape. However, the threat to data at rest may actually be greater when it is stored on disk than tape because the on-disk data is more current, and therefore more valuable. Further, the data at rest on-disk is more likely to be accessible via a network, and a greater number of individuals are likely to have access to the data, whether rightfully or not. The problem may even be worse than it generally appears because data breaches tend to be under-reported because of potential embarrassment and bad publicity.

There are commercially available behind-the-server encryption devices for disk-based storage which connect via Fibre Channel ("FC") devices and are capable of encrypting data streams at wire speed with negligible latency. These FC based devices perform a relatively simple transport function, utilizing information such as the identity of the host from which the request has come and LUN IDs provided by the file server. For the sake of clarity, it should be recognized that there are two levels of LUN IDs in FC. FC itself has an 8-byte LUN ID (a logical entity). There is also a 3-bit LUN ID within the SCSI command description block ("CDB"), which is a holdover from a time when the only option was to have up to 7 devices on a SCSI chain. These IDs combine to identify the logical entity precisely. In particular, the FC devices use the FC LUN ID (8 bytes, including the WWN of the host), and may also use the 3 bit SCSI LUN ID within the CDB, to identify uniquely the intended LUN. The encryption capabilities supported are on a per-LUN basis. In NAS systems, filesystems are often striped across LUNs, and even more commonly, are built atop multiple LUNs. As a result, a NAS system utilizing current FC devices can cause multiple file systems to have their respective data encrypted with the same key. This commingling causes a security vulnerability because, for example, the owner of a file in one file system could deduce the key used to encrypt that file, and then use that key to decrypt files in other filesystems, i.e., files owned by others. Where the same key is used for the entire LUN, the person could gain access to any data in that LUN.

One solution to the commingling problem is a full proxy server which operates in front of the existing file server. The proxy server compares the pathname of the component being accessed with the pathname of the top of the container, i.e., the share or export. However, even this simple context support comes at a significant price in terms of performance because two additional trips through the entire protocol stack are required in addition to the processing overhead required for the encryption itself.

SUMMARY OF THE INVENTION

In accordance with one embodiment of the invention, data storage apparatus available to at least one client via a network comprises: a file server capable of communication with the client via the network; physical storage; and an encryption module in communication with both the file server and the physical storage; wherein the encryption module is operable in response to signaling from the file server, including an indication of a range of blocks of data, to cause encryption of the range of blocks with an encryption key that is unique within the physical storage.

In accordance with another embodiment of the invention, a method for storing data in physical storage available to at least one client via a file server capable of communication with the client via a network, comprises the steps of: with an encryption module in communication with both the file server and the physical storage, in response to signaling from the file server including an indication of a range of blocks of data, causing encryption of the range of blocks with an encryption key that is unique within the physical storage.

One advantage of the invention is improved key separation. Key separation is improved because unique keying can be provided down to the block level in storage, as desired. Consequently, it is possible to avoid undesirable key sharing not only at the block level, but also at higher unit levels such as portions of files, whole files, and file systems. Previously, encryption keys were unique at relatively high levels, such as a per-LUN basis. By providing key separation at lower levels it is possible to avoid the commingling of encrypted data, i.e., the use of a common key for different owners.

DETAILED DESCRIPTION

Figure 1:
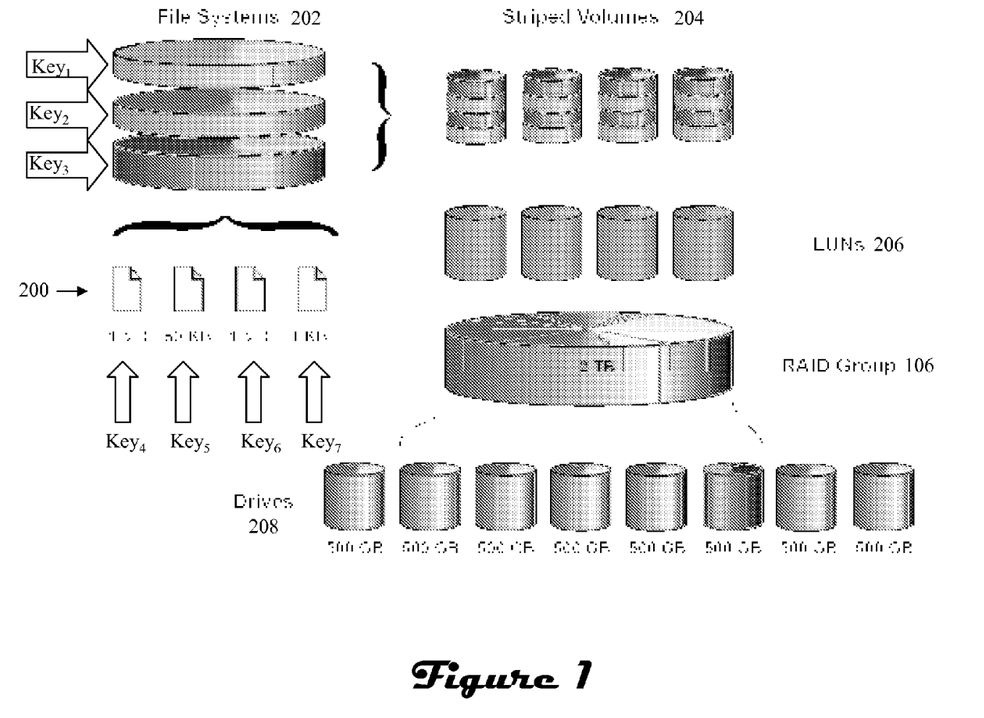
FIG. 1 illustrates elements of the storage hierarchy and key separation.

FIG. 1 illustrates the relationships between logical and physical devices on which files and file systems are stored. Files (200) stored in the RAID group (106) are described by file systems (202). The file systems (202) are striped across logical storage volumes (204). Each logical storage volume is actually a separate LUN (206), i.e., an identifiable, addressable entity. The RAID group is made up of an array of physical drives (208), i.e., "spindles." Each LUN is a logical mapping of some portion of the RAID group, which in turn is a mapping of some number of the physical drives. The file systems may map to parts of multiple LUNs. As will be described below in detail, encryption keys will correspond uniquely with portions of files, individual files, individual filesystems, and any other unit that can be described with block ranges.

Figure 2:
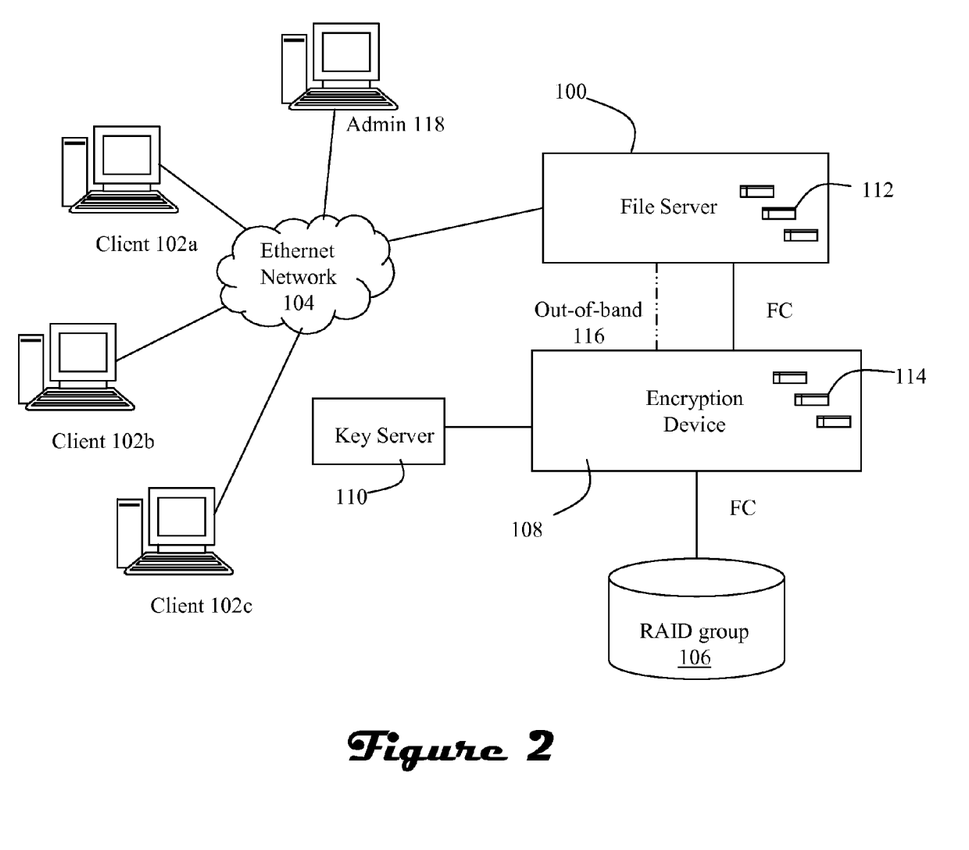
FIG. 2 illustrates a storage architecture operable to use block maps to enable intelligent encryption and key separation.

Referring to FIG. 2, a storage architecture includes a file server (100) in communication with clients (102a, 102b, 102c) via a local area network (104) using a first protocol such as Ethernet. In the case where the architecture is isolated from wider area networks by a firewall, data transmitted between the file server and clients may be "in the clear." The file server (100) is also in communication with a RAID group storage array (106) via an encryption module such as an in-line encryption device (108) using a second protocol such as Fibre Channel ("FC"). The encryption device (108) is optionally in communication with a key server (110) which operates to provide the encryption keys. In the absence of a key server, the encryption device would generate and manage keys. It should be noted that the encryption module may be embedded within a storage array or other device or devices.

An out-of-band channel (116) is employed by the file server to prompt the encryption device to implement encryption key separation corresponding to the files (200), portions thereof, and filesystems (202). One technique for describing a set of blocks to be encrypted with a unique key is to use a block map. The block map is a collection of offsets into the logical disk. In one embodiment of the invention, the encryption device (108) is capable of responding to block maps signaled via the out-of-band channel to encrypt the corresponding data in the RAID group that relate to block maps with a unique key. In the illustrated example, the encryption device is responsive to an indication of the starting address of the data blocks.

Tables in the file server and encryption device are employed to maintain the mappings. At least one set of nested tables (112) in the file server contains mappings of ID to block range, and at least one set of nested tables (114) in the encryption device contains mappings of block range to encryption key. Where the data compartment, i.e., key separation, corresponds to a file system, the file server maintains at least one table indicative of the ranges of blocks that are owned by the file system. In order to declare different sets of ranges as being unique it is necessary to uniquely identify each individual file system in some way. Individual filesystems typically have unique IDs within a file server. These file system IDs could be used as-is for identification, but their scope of uniqueness may be too narrow because the same file system ID can be used by different file servers to identify different filesystems. Consequently, the file system IDs may be further qualified by binding them with the server's host ID. In other words, the complete ID is a combination of the server ID and the file system ID. Since the key compartment may correspond to a unit other than a file system, the field with which the complete ID is bound will be referred to generally as the component ID ("CID").

A signaling protocol is defined to enable the file server to signal IDs and block ranges to the encryption device via the out-of-band control channel (116). The out-of-band channel may include a simple IP-based management interface. The file server could employ its world-wide name ("WWN") as the server ID. The map information could look, conceptually, like this (in BNF):

```
<message> ::= <server ID><component list>
<server ID> ::= <string>
<component list> ::= {<component ID><range list>}+
<component ID> ::= <string>
<range list>. ::= {<range>}+
<range> ::= {<range start><range end>}
<range start> ::= <integer 32>
<range end> ::+ <integer 32>
```

From the perspective of the encryption device, the CID might represent a file, a part of a file, or some collection of files and filesystems sharing common security parameters. The encryption device is configured such that the ranges given can be keyed alike, and no other ranges can share that key. The signaling protocol executed by the file server and encryption device should be rich enough to support various useful commands. There should be means to extend ranges associated with an ID, and means to remove ranges. There should be means to query for an ID based on a range, and the inverse as well. It is possible to reduce all of the "set" operations into a single command, where the range information is always maintained by the server and the command to the encryption device is always taken as a complete map.

Figure 3A:
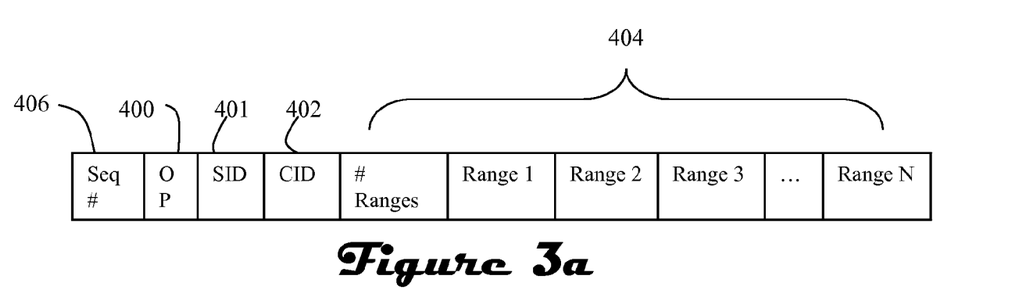
FIG. 3a illustrates an encoding format for signaling block ranges.
Figure 3B:
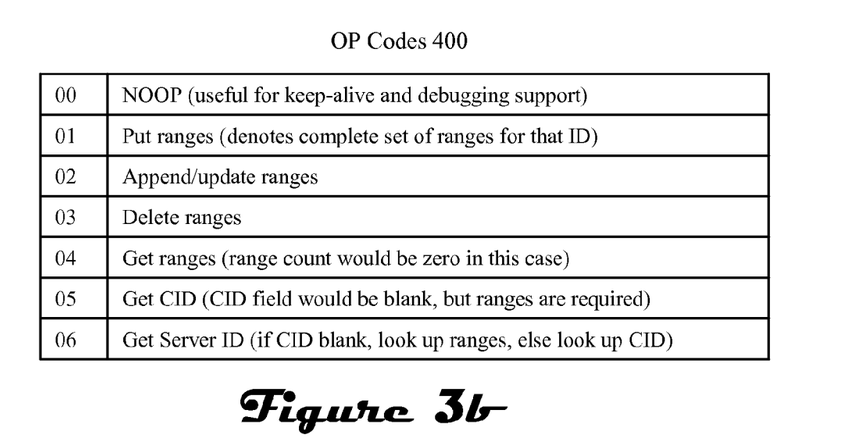
FIG. 3b illustrates OP codes for use between the file server and the encryption device.

FIGS. 3a and 3b illustrate possible encoding and OP codes (400). The server ID ("SID") (401) is the WWN or other unique identifier of the owner of the data component. The CID (402) is the ID of the component, e.g. filesystem, file, group of files, community, partial file. Assuming that the range fields (404) are of fixed length (pairs of integers), having the range count makes the packet structure easy to decode. The encryption device acknowledges each message received, and the ACK message contains the sequence # (406) of the message being acknowledged. The sequence # field denotes per-SID sequential position. The file server ensures that messages are sent in sequence and numbered accordingly. The encryption device ensures that operations are applied in sequence. In the event of an out-of-sequence message, the encryption device sends an upstream message to the file server to indicate the problem, and does not process any more messages from that server until the sequence has been restored, e.g., by the file server resending messages. The upstream message is simply a NAK containing the last correct sequence number (zero if none was received). This facilitates operation when an outage occurs at the encryption device. Sequence numbers should survive reboots of both file server and encryption device, and should be sufficiently large (or hierarchical) to ensure that wrapping does not occur. Encoding could be in RPC or XML. By using an attribute-heavy XML schema, the file servers and encryption devices could be at different revisions of the protocol and still work effectively. The "older" components would understand only the older attributes. The alternatives, either RPC or element-heavy XML require that communicating components be in lock-step with respect to the protocol format. The following is an example of what the (attribute-heavy) XML format would look like:

```
<msg seqno="1" sid="12345678" cid="98765432" op="01" count="1">
  <range spos="12345" epos="90123"/>
</msg>
```

The only "brittleness" in this form relates to the top-level tags ("msg") and the only subordinate element tags ("range"). Attributes, over time, can be added without breaking the basic communication. Of course, end points (servers and encryption devices) must be capable of ignoring unrecognized attributes, and must be tolerant of working with older versions.

Referring to FIG. 2, in order to perform I/O operations subsequent to the data encryption described above, the encryption device captures the blocks involved in a read or write operation and looks up the associated key in response to in-band signalling. For the illustrated example it is assumed that the blocks involved in a single I/O operation relate to at most one key. With the blocks known, the encryption device performs a look-up to get the associated key. The encryption device already has an indication of the identity of the WWN of the sending server from the source address of the packet. This information can be essential to a proper lookup because the same block ranges could exist for any number of servers. As already discussed, the data structure used to hold the range-to-key mapping is a set of one or more nested tables. The outermost table is a simple hash table, indexed by the SID. A query of the outermost table results in another table which contains the keys, indexed by range. Ranges themselves have a start position and an end position, but the blocks involved in the I/O operation are likely neither of these values, so a simple hash function is insufficient. The actual mechanism used for this lookup should be efficient, and may be a simple mod-based function. By performing a modulo remainder function on the actual block values, the search is narrowed quickly and dramatically, in the best case to a single value, but in any case to a relatively small number (in search terms). The encryption device then queries the key server for the key relating to the block range determined from the tables.

Figure 4:
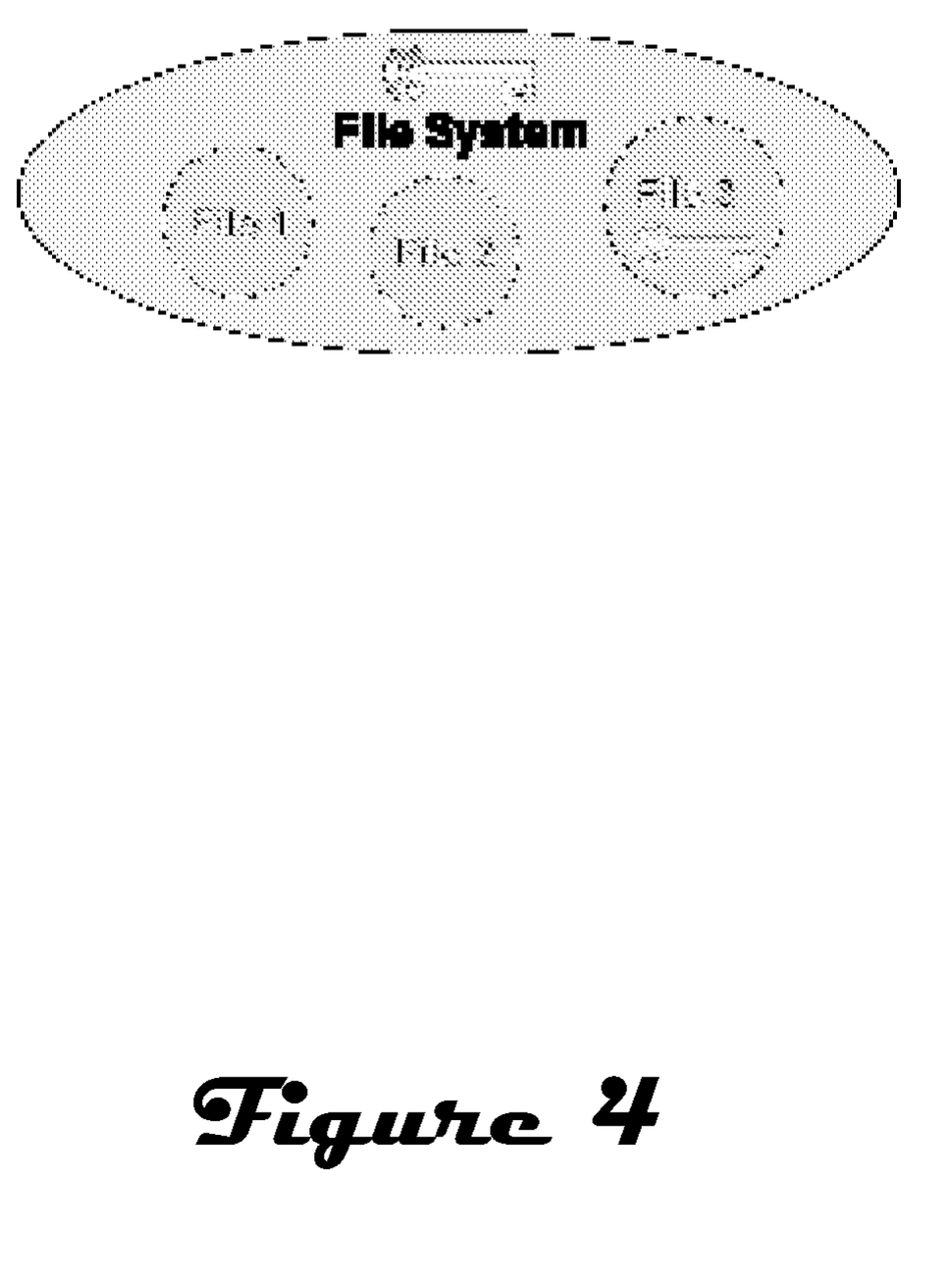
FIG. 4 illustrates a basic hierarchical protection model.
Figure 5:
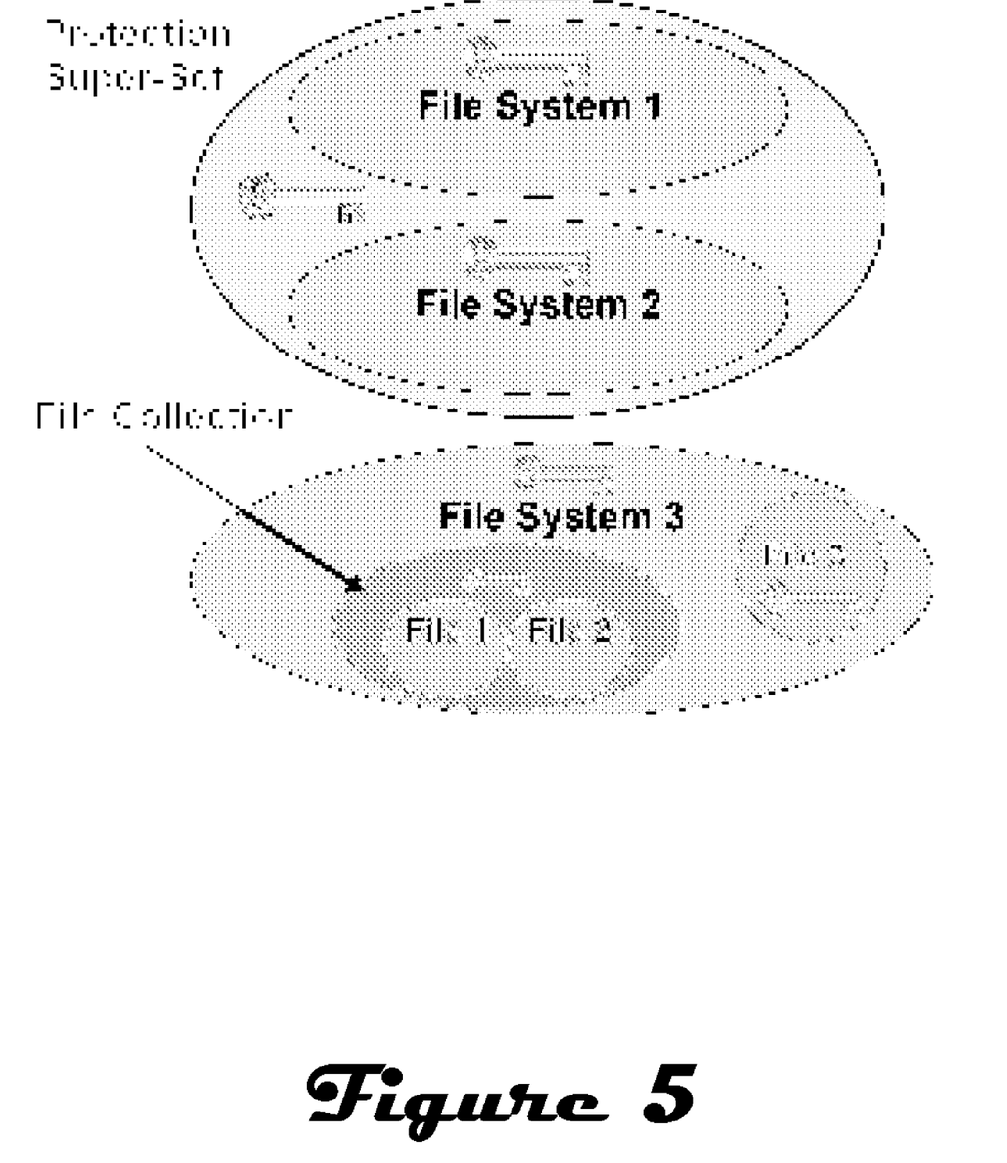
FIG. 5 illustrates an enhanced hierarchical protection model.

Referring to FIGS. 4 and 5, in one embodiment the invention supports hierarchical levels of confidentiality. In the illustrated examples data is organized in such a way that a major collection of files would have one level of confidentiality (or ownership), while individual files or sub-sets of the original collection would have different (i.e. higher) confidentiality levels. Support for this functionality includes means by which to associate keys with sets of data and optionally proper subsets of those data sets. This enhancement provides one technique for processing data at the moment of creation within the NAS environment. Without this enhancement, new data could have no specifically associated key. A key could be assigned, for example, once the file was identified. This would require keying-in-place, but that mechanism is desirable in at least some implementations anyway. However, there would be data (i.e., potentially confidential data) that would be un-encrypted for some period of time. To address this potential vulnerability, as new data is written to a confidential file system it may be keyed with the per-file system key, i.e., the default key. The new file would thus be protected from its creation. If and when a file is associated with a more specific security community or group, it can be re-keyed using the key for that community (the subset key). The encryption device would have to be able to support multiple nested communities per block range and use the most specific (i.e. most confidential) keys. This is more of a hierarchy than a true set/subset arrangement, and may be simpler to implement. The hierarchy could potentially be extended to include portions of files. Grouping multiple filesystems into a single community (super-set) could also be done, and should not impose any significant additional burden on the encryption device, this because the encryption device never knows why certain block ranges are affiliated or not. Subsets and supersets then appear to the encryption devices as simply more block ranges associated with a single key.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A data storage apparatus available to at least one client via a network, comprising:
    a file server capable of communication with the client via the network;
    physical storage including blocks of data;
    an encryption device in communication with both the file server and the physical storage, the encryption device enabled to store one or more mappings of an indication of a range of blocks of data on the physical storage to an encryption key; wherein the indication indicates a start position and an end position of the blocks on the physical storage to be encrypted;
    wherein the encryption device is operable in response to signaling from the file server, the signaling including an indication from the file server of a range of the blocks of data on the physical storage on the storage apparatus, wherein the indication from the file server indicates a start position and an end position of the blocks on the physical storage to be encrypted, to cause the encryption device to encrypt the range of blocks of data on the physical storage with an encryption key that is unique to the mapping of the indicated block range to the physical storage, and wherein the encryption device is operable to store the pairing of the range of blocks and the encryption key wherein the file server includes at least one nested table indicative of a mapping of component ID to block range.

2. The apparatus of claim 1 wherein the encryption device is embedded with the physical storage.

3. The apparatus of claim 1 wherein the range of blocks defines a portion of a file.

4. The apparatus of claim 1 wherein the range of blocks defines a single file.

5. The apparatus of claim 1 wherein the range of blocks defines a single file system.

6. The apparatus of claim 1 wherein the range of blocks defines multiple files.

7. The apparatus of claim 1 wherein the range of blocks defines multiple file systems.

8. The apparatus of claim 1 wherein the range of blocks defines logical collections of files, parts of files and or file systems representing distinct communities.

9. The apparatus of claim 1 wherein the file server is operative to signal a block map indicative of a range of blocks corresponding to a component ID to the encryption device via an out-of-band control channel.

10. The apparatus of claim 9 wherein the file server is further operative to signal the component ID via the out-of-band control channel.

11. The apparatus of claim 10 wherein the file server is further operative to signal a server ID via the out-of-band control channel.

12. The apparatus of claim 10 wherein the component ID is an ID of a component selected from the group consisting of file system, file, group of files, community, and partial file.

13. The apparatus of claim 11 wherein the server ID is the World Wide Name of the file server.

14. The apparatus of claim 11 wherein the encryption device includes at least one nested table indicative of a mapping of block range to encryption key.

15. The apparatus of claim 1 wherein new data, to be written to the physical storage, is encrypted with a per-file system default key.

16. The apparatus of claim 1 wherein new data, to be written to the physical storage, is encrypted with a per-array default key.

17. The apparatus of claim 15 wherein the new data is rekeyed with a subset key.

18. A method for storing data in physical storage including blocks of data available to at least one client via a file server capable of communication with the client via a network, comprising the steps of:

with an encryption device in communication with both the file server and the physical storage, the encryption device enabled to store one or more mappings of an indication of a range of blocks of data of the physical storage to an encryption key, wherein the indication indicates a start position and an end position of the blocks on the physical storage to be encrypted; in response to signaling from the file server including an indication of the range of blocks of data on the physical storage wherein the indication indicates a start position and an end position on of the blocks on the physical storage to be encrypted, causing the encryption device to encrypt the range of blocks of data on the physical storage with an encryption key that is unique to the mapping of the indicated block range to the physical storage and the encryption device operable to store the pairing of the range of blocks and the encryption key;

generating at least one nested table indicative of a mapping of component ID to block range.

19. The method of claim 18 wherein the range of blocks defines a portion of a file.

20. The method of claim 18 wherein the range of blocks defines a single file.

21. The method of claim 18 wherein the range of blocks defines a single file system.

22. The method of claim 18 wherein the range of blocks defines multiple files.

23. The method of claim 18 wherein the range of blocks defines multiple file systems.

24. The method of claim 18 wherein the range of blocks defines logical collections of files, parts of files and or file systems representing distinct communities.

25. The method of claim 18 including the further step of the file server signaling a block map indicative of a range of blocks corresponding to a component ID to the encryption device via an out-of-band control channel.

26. The method of claim 25 including the further step of the file server including an indication of the component ID via the out-of-band control channel.

27. The method of claim 26 including the further step of the file server including an indication of a server ID via the out-of-band control channel.

28. The method of claim 27 wherein the component ID is an ID of a component selected from the group consisting of file system, file, group of files, community, and partial file.

29. The method of claim 27 wherein the server ID is the World Wide Name of the file server.

30. The method of claim 27 including the further step of the encryption device maintaining at least one nested table indicative of a mapping of block range to encryption key.

31. The method of claim 18 including the further step of encrypting new data, to be written to the physical storage, with a per-file system default key.

32. The method of claim 18 including the further step of encrypting new data, to be written to the physical storage, with a per-array default key.

33. The apparatus of claim 1 wherein the blocks of data are mapped to the physical storage via a logical mapping.

34. The apparatus of claim 18 wherein the blocks of data are mapped to the physical storage via a logical mapping.

* * * * *